United States Patent [19]

Wing

[11] 4,112,992
[45] Sep. 12, 1978

[54] SAFETY BOLT

[75] Inventor: George S. Wing, Palos Verdes Estates, Calif.

[73] Assignee: Hi-Shear Corporation, Torrance, Calif.

[21] Appl. No.: 760,416

[22] Filed: Jan. 19, 1977

[51] Int. Cl.² ............................................. F16B 39/04
[52] U.S. Cl. ............................................. 151/29; 151/6
[58] Field of Search ............... 151/6, 5, 9, 8, 69, 151/2 R, 28, 29, 27, 41.5, 13, 41; 85/3 S, 5 E, 5 M; 24/211 P, 211 R

[56] References Cited

U.S. PATENT DOCUMENTS

| 17,410 | 5/1857 | Williams | 151/6 |
|---|---|---|---|
| 292,513 | 1/1884 | Shailer | 151/41.5 |
| 577,039 | 2/1897 | King | 85/3 S X |
| 1,179,924 | 4/1916 | Howell | 85/3 S X |
| 1,246,353 | 11/1917 | Thigpen | 151/13 |
| 1,403,902 | 1/1922 | Fields | 151/13 |
| 1,573,328 | 2/1926 | Sale | 151/41.5 |
| 1,595,213 | 8/1926 | Neubauer | 151/6 |
| 3,561,516 | 2/1971 | Reddy | 151/9 |
| 3,851,690 | 12/1974 | Wing et al. | 151/8 |
| 3,942,570 | 3/1976 | Bochman et al. | 151/8 |

FOREIGN PATENT DOCUMENTS 1,901 of 1908 United Kingdom .................. 24/211 P Primary Examiner—Ramon S. Britts
Attorney, Agent, or Firm—Donald D. Mon

[57] ABSTRACT

A safety bolt having retention means to prevent its removal from a hole unless the retention means is released. The bolt includes a solid shank, and the retention means, which is outside the hole, has a slot with a pivoted latch means which is biased to move outside the diameter of the shank to prevent removal of the bolt. Access to the latch means enables it to be pivoted to a non-interfering position. The retention means can also form part of means to prevent a nut from being unthreaded from the bolt.

5 Claims, 8 Drawing Figures

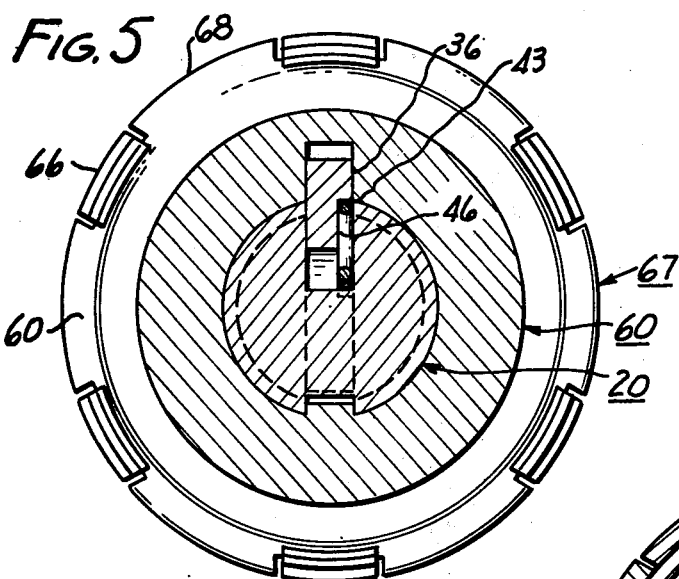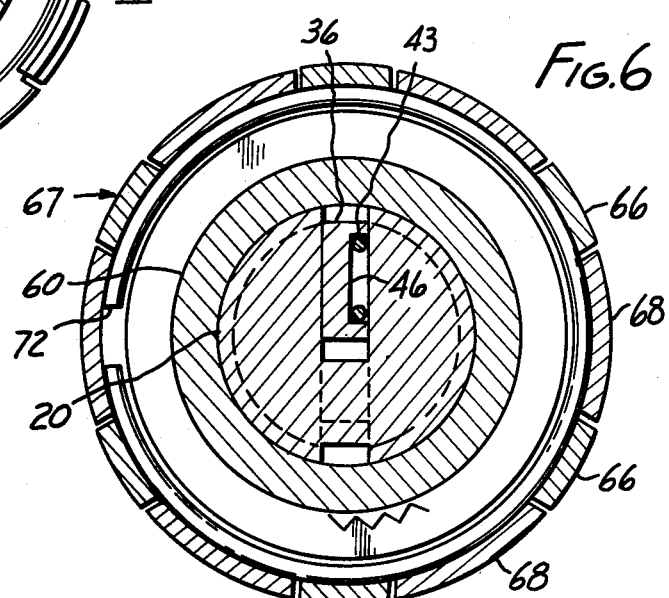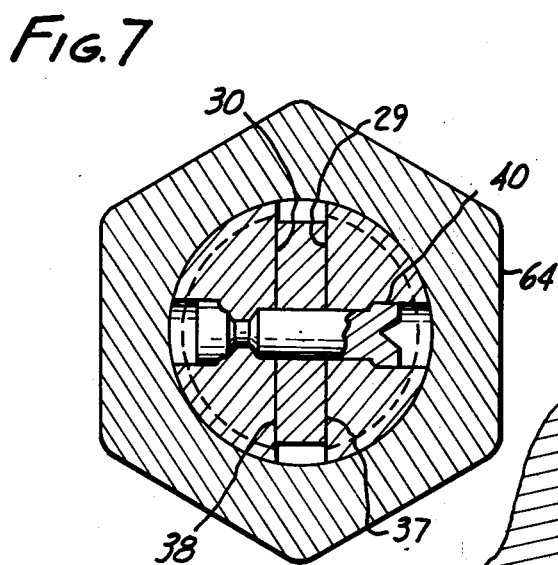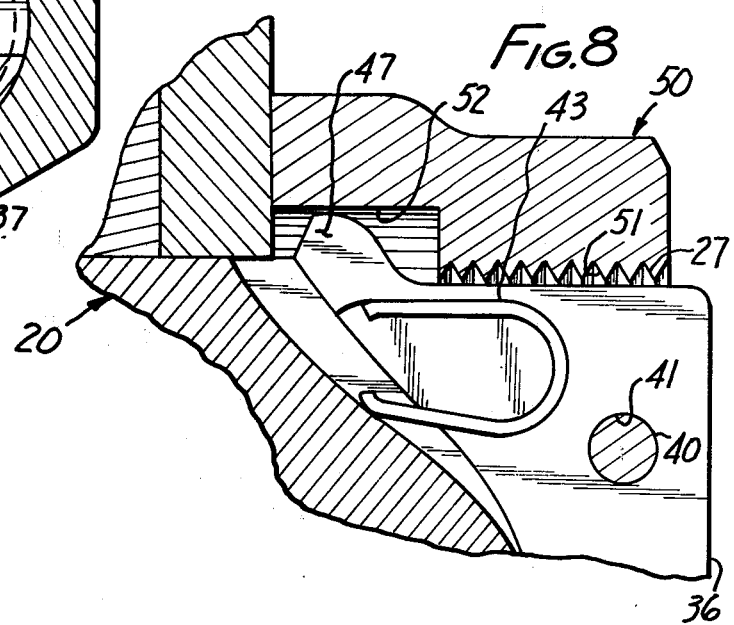

SAFETY BOLT

This invention relates to a safety bolt.

Especially in the aircraft and aircraft engine fields where threaded nut-bolt combinations are used, the shaking loose of the nut from the bolt can have catastrophic results if the bolt itself falls out of the hole. Such results can be prevented entirely in many installations by providing means to prevent the bolt from leaving the hole. For example, if the bolt is used in a shear joint wherein axial clamping is of minor importance, any retention means which will prevent the bolt from sliding out of the hole will forestall failure, because the bolt will still function in the shear mode. Even if the lost nut was relied on for some strength of axial retention, means which hold the bolt in the hole may themselves have sufficient axial strength to protect the structure from catastrophic failure. It is an object of this invention to provide a safety bolt which can readily be installed, reliably be retained in the hole, and readily be released. But the release can only be accomplished by proper manipulation.

It is an optional feature of this invention to provide the safety bolt with means for also restraining a nut threaded thereto from falling off, thereby providing a redundancy of bolt retention features.

A safety bolt according to this invention has an axis, a head, an axially extending solid shank with a diameter, and a retention section in that order from the head. The safety bolt is installable in a hole in a workpiece, the workpiece having a face at each end of the hole, with the head bearing against a first of the faces, the shank closely fitting in the hole, and the retention section projecting beyond the second of said faces. The retention section itself has an outer wall and a slot opening through this outer wall. A latch member in the slot is pivotally mounted to this section and is movable to a first position wherein a portion of the latch member projects radially beyond the diameter of the shank whereby to bear against the second face and prevent the bolt from leaving the hole and a second position wherein said portion lies within the diameter to permit the bolt to leave the hole. Bias means biases the latch member toward the first position.

According to a preferred but optional feature of the invention, the slot is bounded by a pair of parallel sidewalls which are parallel to the axis, the latch member is plate-like and fits between the sidewalls, and a pivot pin extends between the sidewalls to pivotally mount the latch member in the slot.

According to still another preferred but optional feature of the invention, the retention section is provided with an external thread to receive an internally threaded nut. The nut is provided with teeth which are selectively engageable by teeth on a locking ring which locking ring is interposed between the nut and a base ring which base ring is restrained against rotation relative to the retention section. The locking ring is axially shiftable so as to engage and disengage the teeth whereby to prevent and permit nut rotation respectively.

The above and other features of this invention will be fully understood from the following detailed description and the accompanying drawings in which.

Figure 3:
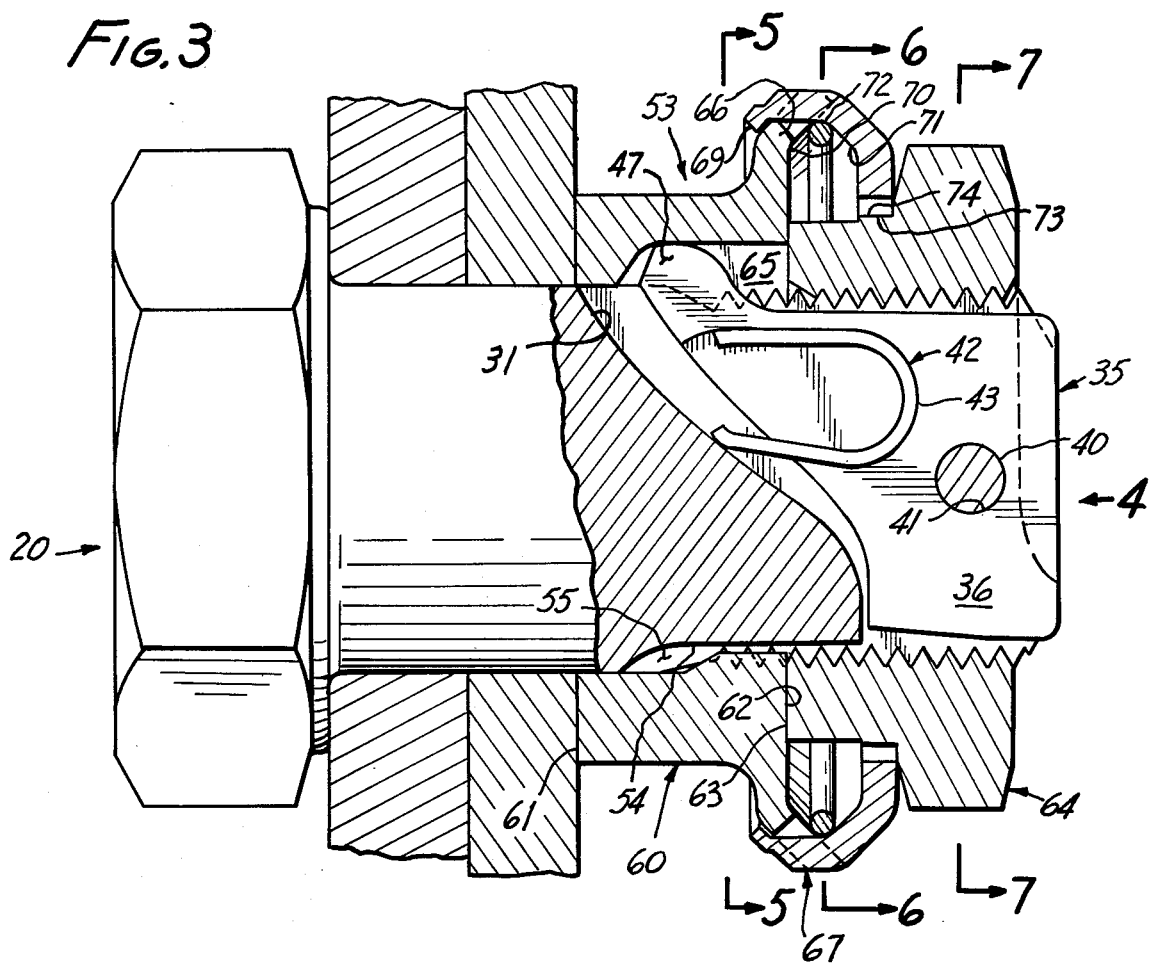
FIG. 3 is a similar view showing a fully installed safety bolt.

FIGS. 5, 6 and 7 are sections taken at lines 5—5, 6—6 and 7—7 respectively in FIG. 3; and FIG. 8 is a fragmentary showing of still another embodiment of the invention.

Figure 1:
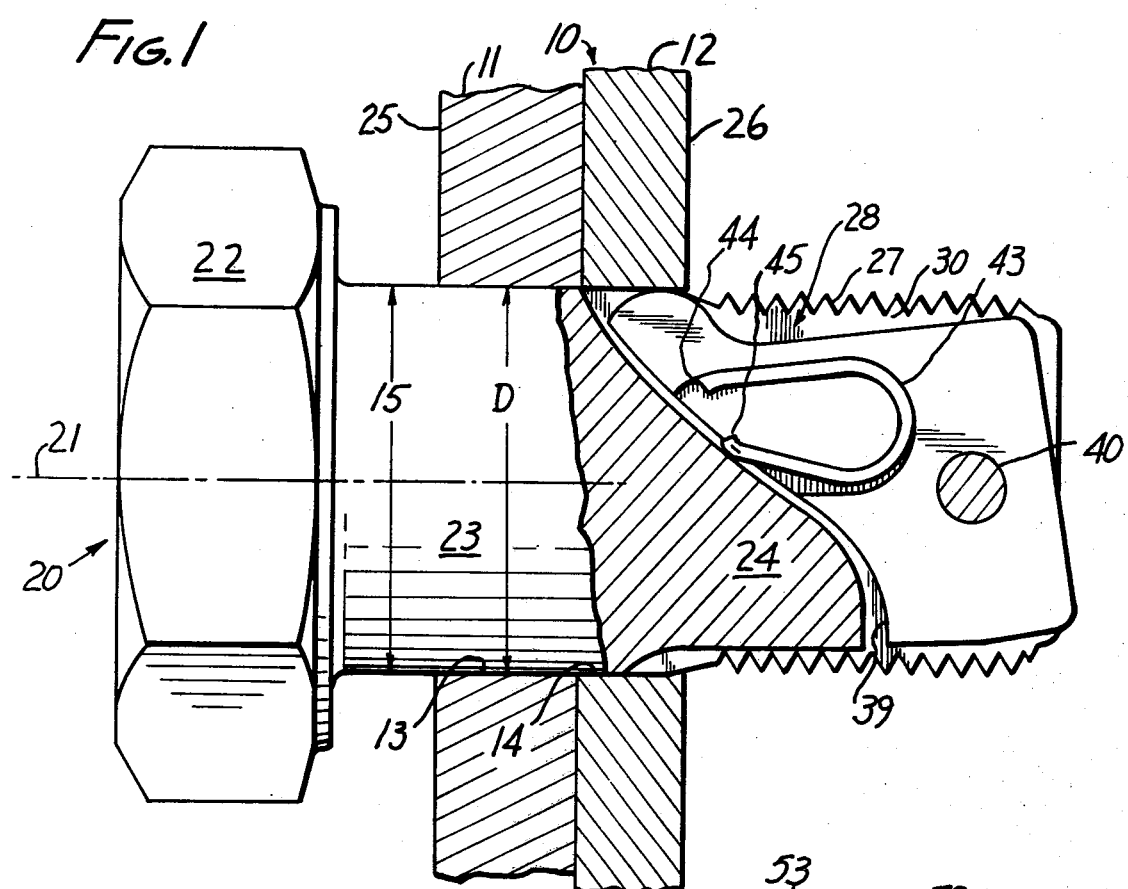
FIG. 1 is a side elevation partly in axial cross-section showing the presently-preferred embodiment of a safety bolt according to the invention, being installed in a hole in a workpiece.

In FIG. 1 there is shown a workpiece 10 comprising a pair of plates 11, 12 with aligned holes 13, 14 therethrough. Sometimes these two holes are collectively referred to as "a hole" through the workpiece. These circular holes have a diameter 15. Plates are merely one example of a workpiece. The nature of the workpiece is immaterial to this invention.

Safety bolt 20 is provided for joining the parts of the workpiece together. While it can be used as a tension-type fastener, it is primarily intended to be used in a shear joint as shown. the safety bolt has an axis 21, a head 22, an axially extending circularly cylindrical solid shank 23 and a retention section 24. The head, shank and retention section are integral with one another and exist in the order recited. "Solid" as used for the shank, means that the shank is not drilled, slotted or otherwise reduced in cross-section to accomodate the retention means. The shank in the workpiece is without voids in the cross-section.

The workpiece has a first face 25 against which the head bears, and a second face 26 at the opposite end of the hole. The retention section is intended to project beyond the second face so that only the shank fits within the hole. Accordingly the retention section is regarded in this specification as that part adjacent to the shank which projects beyond the workpiece. Some parts of the retention section may be circularly cylindrical, just as the shank is circularly cylindrical. In fact it can be a continuation thereof. The shank has a diameter "D" which is close to that of diameter 15, the difference in diameters being determined by the class of fit of the joint. The closer to a "zero" fit, the more nearly equal will be the diameters 15 and D.

As best shown in FIG. 1, the retention section includes an external thread 27 to receive a nut. The end of the retention section has a slot 28 milled therein so as to form two slot sidewalls 29, 30 which are parallel to each other and to the central axis. The slot also has a base 31.

Latch means 35 forms part of the retention section 24. It comprises a plate-like member 36 with sidewalls 37, 38 parallel to sidewalls 29 and 30. It has an edge 39 which is formed so as to have a clearance from base 31 in all operating positions of the latch means when the bolt is fitted in the hole in the workpiece. A pivot pin 40 extends between sidewalls 29 and 30 and passes through a hole 41 in member 36 so as to pivotally mount the member. The axis of pin 40 preferably is normal to and intersects the central axis 21. Member 36 is held against twisting by the pin and also by abutment of its sidewalls with the slot sidewalls.

Bias means 42 comprises a C-shaped spring 43 with ends 44, 45 which bear in compression against the latch means and base 31. This spring is seated in a recess 46 in a sidewall of the member 36. The effect of this bias means is to bias the latch means toward a first position (shown in FIG. 3) where a portion 47 projects beyond the diameter 15 of the shank. It will then overhang the plate 12 adjacent to the right hand end of hole 14 and prevent the removal of the bolt unless the latch means is pivoted to a second position (shown in FIG. 1) in opposition to the bias means. It will be observed that the slot 28 is open at the end of the retention section so as to give access to the member 36. Accordingly the bias of means 42 can be overcome by pressing on the upper right hand corner of the member 36 in FIG. 3 so as to retract it to the position shown in FIG. 1, pulling portion 47 back within the envelope defined by diameter 15.

The construction already described is an effective safety bolt. Without a nut it can serve to retain the bolt in the workpiece hole. FIG. 8 illustrates this to be true wherein the portion 47 is shown in the safety locking position. It will be noted that the slot terminates outside of the workpiece so that the entire length of hole is engaged by the cylindrical solid shank for service as a shear type fastener. The retention section is of course weakened by the slot but this is at a position outside of the workpiece, and has no effect on the shear strength of the bolt in the workpiece.

In the simplest embodiment of the invention a nut 50 has an internal thread 51 to be threaded onto external thread 27 of the bolt. It also has a counterbore 52 to clear portion 47 so as not to impede its extension.

In many uses of a bolt of this type, it also is desirable to provide redundancy of retention by locking the nut to the bolt. This lock bolt is capable of combining these two functions. One means for this purpose includes a notch 55 (FIG. 3) in the wall of the retention section. Notch 55 is sometimes called "notch means". This could be a continuation of the slot 28. A ring-like intermediate collar 53 includes a bearing face 61 to bear against second face 26 of the workpiece. It also includes a bearing face 62 to bear against a face 63 of nut 64. The intermediate collar includes a base ring 60 with a slot 65 to receive the portion 47. This arrangement will prevent the intermediate collar from turning. Also the base ring 60 includes a finger 54 which can fit in notch 55, which will prevent the intermediate collar from turning. Either of these arrangements can be used alone, the slot 65 being omitted, or the finger 54 and notch 55 being omitted. However, when both are used and are placed 180° apart, an improved restraint is provided.

The base ring includes engagement means 66 comprising a plurality of spaced apart projections which extend outwardly and away from the workpiece. A locking ring 67 surrounds the nut and overlaps part of the base ring, and includes engagement means 68 which also are projections but extend in the opposite direction.

The locking ring can be moved axially relative to the intermediate collar. It has turned over clips 69 to prevent its being separated from the base ring.

Figure 4:
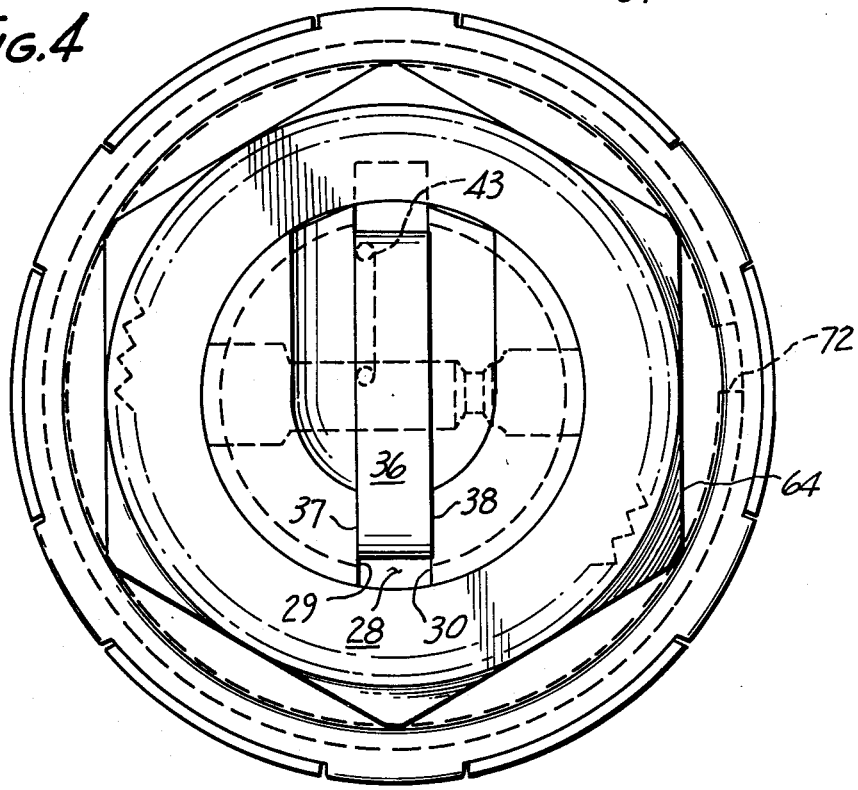
FIG. 4 is a right hand end view of FIG. 3.

Ramp surfaces 70, 71 on the base ring and on the locking ring, respectively, are engaged by second bias means 72. This bias means is a ring-like compression spring (see FIG. 4) rather like a piston ring which is compressed radially so it tends to exert an outward force on both of the ramp surfaces. This biases the locking ring away from the base ring. The engagement means always remain engaged.

Radially spaced apart teeth 73 are provided on the locking ring which face inwardly. Matching teeth 74 are formed around the nut facing outwardly. When the locking ring is in the position shown in FIG. 3 the teeth engage. When the locking ring is moved axially so as to compress the second bias means inwardly, teeth 73 move axially past and away from teeth 74 and the nut is released to turn. Locking means of this type have been shown in wheel nuts, for example, in George S. Wing U.S. Pat. Nos. 3,851,690 and 3,942,570. Such an arrangement performs admirably in this locking technique.

The use of the embodiments of this invention should be evident from the foregoing. In the embodiments of FIGS. 3 and 8, the safety bolt with a correct length of shank is pressed through the hole as shown in FIG. 1. The portion 47 need not be pressed down from the free end to insert the bolt because it is pressed down by the wall of the hole. When it passes beyond second face 26, it will be moved out by the bias force to the position shown in FIG. 8. If the nut is not to be a locking type, then the nut 50 is simply tightened on and the joint is complete. Should the nut shake loose, portion 47 will interfere with the face 26 because it extends beyond the diameter of the shank (which is substantially the same as the diameter of the hole), and prevent withdrawal of the bolt. Should it be desired to withdraw the bolt, then off-axis forces exerted on the end of member 36 will pivot portion 47 inwardly sufficiently so that it can enter the slot and stand out of the way of the passage of the wall of the hole over it.

Figure 2:
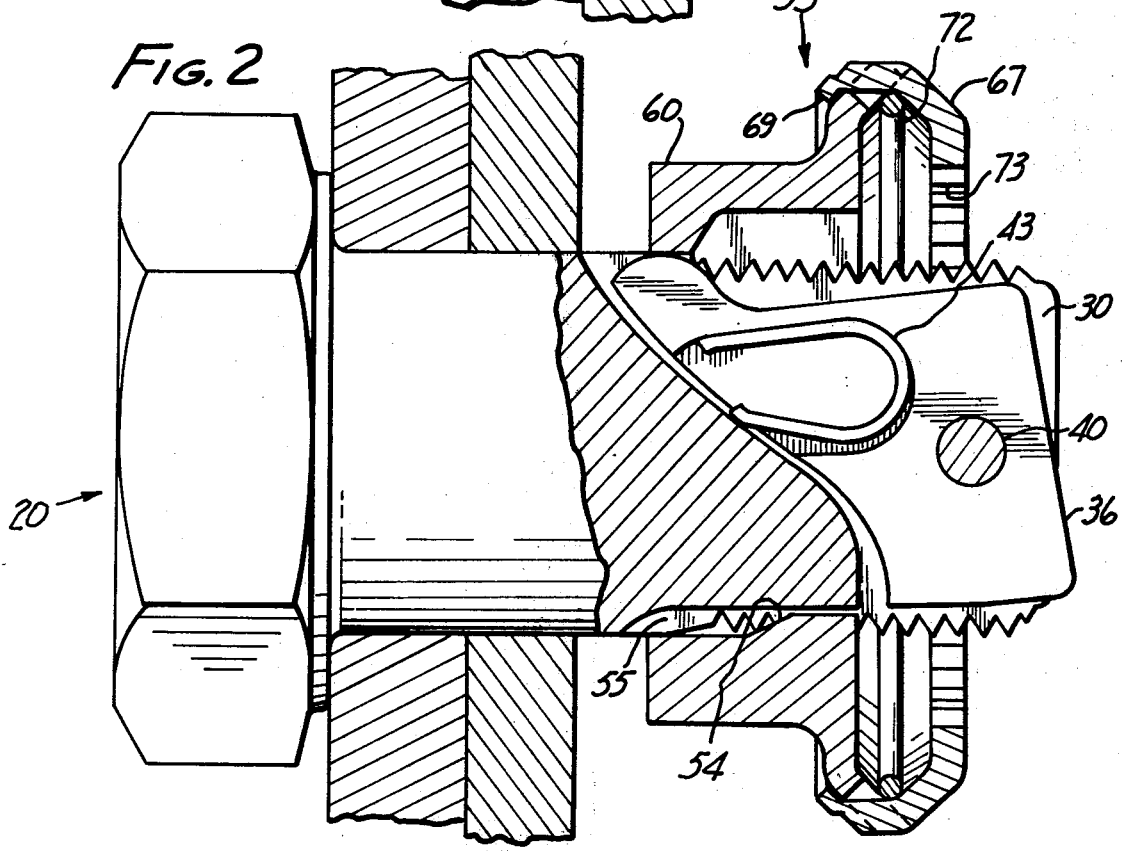
FIG. 2 shows a second step in the installation of one embodiment of the invention.

Should the locking feature be desired, then the bolt is installed as indicated and the intermediate collar is passed over the locking means as shown in FIG. 2 until it abuts the second face of the workpiece. The dimensions of slot 65 will have been selected and located so that the portion 47 can pass into it to engage the intermediate collar and prevent it from rotating. Then the nut is applied. As soon as the nut comes against teeth 73 there can be no further rotation because of the interference of the teeth. Accordingly, in order to install the nut correctly, the locking ring will be pressed toward the workpiece to separate the teeth while the nut is being tightened down. After the nut is tightened, the locking ring is released and it can spring back so that teeth 73 and 74 mesh and hold the nut against rotation. There will be enough teeth and play in the mechanism to permit minor adjustments of position so that the teeth can always engage one another without excessive change in tightness of the nut. In the unlikely event that the nut falls off, it is impossible for the intermediate collar also to fall loose should the angularity of the edge of portion 47 and of the contiguous part of the slot be outside the angle of friction. Should it be within the angle of friction, then portion 47 can be cammed back into the hole, but after the intermediate collar is removed, the portion snaps out to interfere with the face 26 and prevent removal of the bolt. Therefore the device of FIG. 3 provides retention means for both the nut and the bolt, while in the embodiment of FIG. 8 it provides for retention only of the bolt.

This invention is not to be limited by the embodiments shown in the drawings and described in the description which are given by way of example and not of limitation but only in accordance with the scope of the appended claims.

I claim:

1. In combination: a safety bolt having an axis, a head, an axially extending solid shank with a diameter, and a retention section in that order, the safety bolt being installable in a hole in a workpiece, said workpiece having a face at each end of the hole, with the head against a first of said faces, the shank closely fitting in said hole, and the retention section projecting beyond the second of said faces, said retention section having an outer wall, an external thread, a slot opening through said outer wall, a latch member in said slot pivotally mounted to said retention section and movable to a first position wherein a portion of said latch member projects radially beyond the diameter of the shank whereby to bear against the second face to prevent the bolt from leaving the hole, and a second position wherein said portion lies within said diameter to permit the bolt to leave the hole, and bias means biasing the latch member toward said first position, said retention section also including notch means angularly spaced from the said portion of the latch means; a nut having an axis and an axial opening, an internal thread in said opening to engage the thread on the retention section, and a plurality of teeth extending around the axis; and an intermediate collar comprising a base ring proportioned to fit around said retention section and having an aperture and a finger in said aperture, said finger being proportioned and arranged to fit in said means to limit rotation of the base ring, sid base ring also having a plurality of engagement means around said axis, a locking ring having a plurality of engagement means to engage the engagement means on said base ring, and a plurality of teeth angularly selectively engageable with said teeth on the nut, said locking ring being axially shiftable, whereby to disengage said teeth to permit rotation of the nut in a first axial position of the locking ring and to engage them to prevent rotation of the nut in a second axial position of the locking ring, said engagement means always being engaged against relative rotation, and bias means biasing the locking ring toward said second axial position.

2. A combination according to claim 1 in which the last named bias means is a substantially circular compression ring spring, and in which the intermediate collar and the locking ring have ramp surfaces engaged by the said last named bias means to transmit the radial force of said last named bias means into said axial bias toward said second axial position.

3. A combination according to claim 1 in which said slot is bounded by a pair of parallel sidewalls which are parallel to said axis, in which the latch member is plate-like and fits between said sidewalls, in which a pivot pin extends between the sidewalls and pivotally mounts the latch member.

4. A combination according to claim 3 in which said slot is open at the end of the safety bolt most distant from the head, exposing an off-axis surface on the latch means which can be pressed to move the latch means toward its second position in opposition to the bias means.

5. A combination according to claim 4 in which the last named bias means is a substantially circular compression ring spring, and in which the intermediate collar and the locking ring have ramp surfaces engaged by the said last named bias means to transmit the radial force of said last named bias means into said axial bias toward said second axial position.

* * * * *